(12) United States Patent
Ford

(10) Patent No.: US 12,325,108 B1
(45) Date of Patent: Jun. 10, 2025

(54) SUPPLEMENT SUPPORT SYSTEM SLEEVE FOR A UNIVERSAL JOINT IMPROVEMENTS / ANGLED FLEX STOP

(71) Applicant: Robert Everett Ford, Canaan, NH (US)

(72) Inventor: Robert Everett Ford, Canaan, NH (US)

( * ) Notice: Subject to any disclaimer, the term of this patent is extended or adjusted under 35 U.S.C. 154(b) by 519 days.

(21) Appl. No.: 17/676,946

(22) Filed: Feb. 22, 2022

(51) Int. Cl.
 *B25B 23/00* (2006.01)
 *B25B 13/06* (2006.01)
 *B29C 45/26* (2006.01)
 *B29C 45/34* (2006.01)

(52) U.S. Cl.
 CPC .......... *B25B 13/06* (2013.01); *B25B 23/0014* (2013.01); *B25B 23/0021* (2013.01); *B29C 45/2608* (2013.01); *B29C 45/2673* (2013.01); *B29C 45/34* (2013.01)

(58) Field of Classification Search
 CPC ........................ B29C 45/2608; B29C 45/2673
 See application file for complete search history.

(56) References Cited

U.S. PATENT DOCUMENTS

| | | | | |
|---|---|---|---|---|
| 4,004,476 A | * | 1/1977 | DeVrou | B25B 23/0021 16/431 |
| 4,430,285 A | * | 2/1984 | Runyan | F16K 27/067 264/264 |
| 4,459,257 A | * | 7/1984 | Baciu | B29C 45/1642 264/328.8 |
| 4,488,573 A | * | 12/1984 | Runyan | F16K 27/067 251/315.15 |
| 4,711,360 A | * | 12/1987 | Ullman | B65D 47/0828 222/546 |
| 4,733,801 A | * | 3/1988 | Scammell | B29C 45/36 222/215 |
| 4,793,501 A | * | 12/1988 | Beck | B65D 47/0838 220/837 |
| 4,917,253 A | * | 4/1990 | Dutt | B65D 47/0842 220/837 |
| 5,003,849 A | * | 4/1991 | Lawrie | B25B 23/0014 81/184 |
| 5,776,406 A | * | 7/1998 | Schubert | C08G 18/4216 528/80 |
| 7,082,864 B1 | * | 8/2006 | Weber | B25B 13/56 81/492 |
| 7,544,889 B1 | * | 6/2009 | Sanchez | H02G 3/126 174/53 |
| 8,201,788 B2 | * | 6/2012 | Carnevali | F16B 5/0635 248/223.41 |
| 2003/0102338 A1 | * | 6/2003 | Martin | B29C 45/33 222/556 |
| 2004/0178540 A1 | * | 9/2004 | Huisman | B27N 3/08 428/319.3 |
| 2006/0202385 A1 | * | 9/2006 | Xu | B29C 33/3878 425/542 |
| 2014/0103005 A1 | * | 4/2014 | Cerveny | B65D 47/0842 425/542 |
| 2018/0141044 A1 | * | 5/2018 | Ebetsberger | A61B 5/150351 |
| 2018/0168753 A1 | * | 6/2018 | Scheib | A61B 90/06 |

* cited by examiner

*Primary Examiner* — Emmanuel S Luk

(57) ABSTRACT

Uniformed improvement to the flex stop system with an effective fit and attachment thereof by improving overall fit to many different types of universal joints, and with the flex and movement for clearance needed with a greater angle of rotation.

3 Claims, 5 Drawing Sheets

A Supplement Support System Sleeve for a Universal Joint Improvements

SUPPLEMENT SUPPORT SYSTEM SLEEVE FOR A UNIVERSAL JOINT IMPROVEMENTS / ANGLED FLEX STOP

BACKGROUND OF THE INVENTION

Improvement of A Supplement Support System Sleeve for a Universal Joint U.S. Pat. No. 9,884,410 B1, the entirety of which is expressly incorporated herein by reference, and further prior art of provisional application titled Machine to Make Part or Parts Attaching Flexing Material on (U.S. 62/918,119), now abandoned, the entirety of which is expressly incorporated herein by reference.

BRIEF SUMMARY OF THE INVENTION

The improvement to that of the solid stop, that of an angled solid stop that of its design thinned, angled that for clearance, rotation movement while insuring the strength of its attachment as to a flex stop with of the design a improved installation process that to a universal joint with that of a durable attachment to thinness to that of a more uniformed fix to different dimension of made universal joints and describing the process to that of the making of, that of means of injection molding, that of a system that of Homestead Manufacturing.

LIST OF REFERENCE CHARACTERS

Angled solid stop 1.
Stop, 2.
Material flexing, 3.
Stop attachment, 4.
Stop attachment support bridging, 5
Reduced stop and stop attachment material, 6.
Process elevation in mold cavity to reduce material, 7.
Mold cavity seal surface three sides, 7*a*.
The reverse of 7 as to top seal, 8.
Stop mold cavity, 8*a*.
The top angle plate stop surface, 9.
Support bridge rounded groove, 9*a*.
The angle plate bridging grooves, 10.
Bottom attachment rounded slot, 10*a*.
The top angle plate rounded slot, 11.
Process, bottom injection mold plate, flex material forward edge placement to attaching, 12.
Process, Angle of stop to attachment, 13.
Injection tapered port, 14, 15.
Optional tapered air release port for manual injection, 16.
Process applying heat for material flow and to assist attachment, Electric insulated connectors, 17.
Electrical resistance wire or wires, 18.
Resistance wire or wires clearance channel in heating plate, 21.

DETAIL DESCRIPTION OF THE INVENTION

Figure 1:
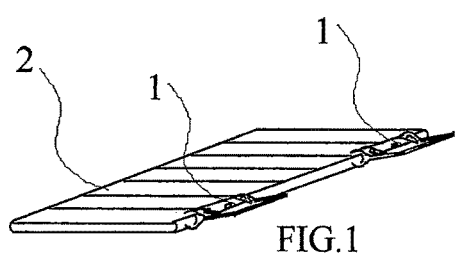
FIG. 1 Showing improved stops and attachment.

FIG. 1 shows Flex material 2 being attached to stop 1. Whereas the process of molded shape or shapes and as to the thickness and or tapered thickness is determined by the design of the molded plates FIG. 3 and FIG. 5 allowing a more universal fit to a verity of the tool part known as a universal joint.

Figure 2:
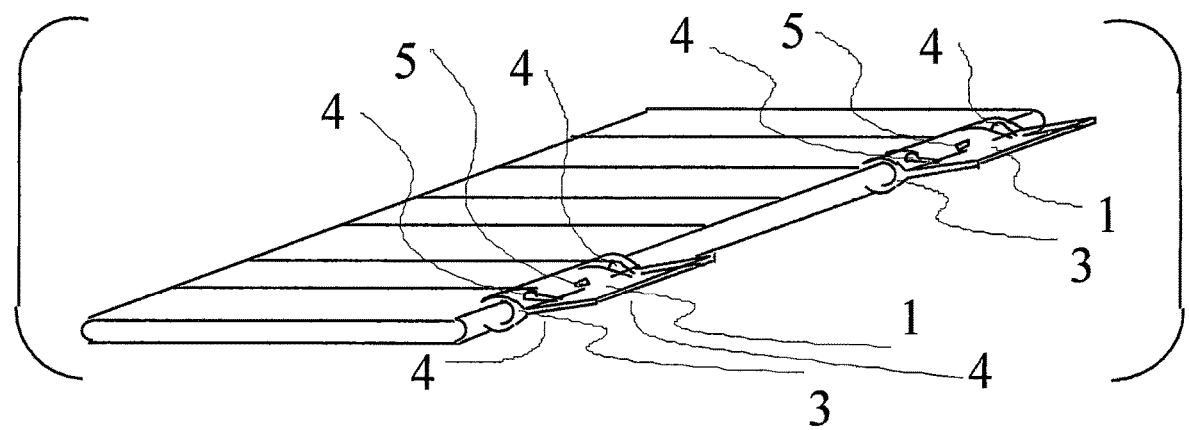
FIG. 2 Showing enlarged detailed view of FIG. 1.

FIG. 2 shows a complete assemble of the stop and attachments 1, 3, 4, 5, and is scaled for what is known as a ⅜ universal joint whereas the size effectively fits this size improving repeatability of use and is not limited to size determination that of difference size universal joints.

Figure 3:
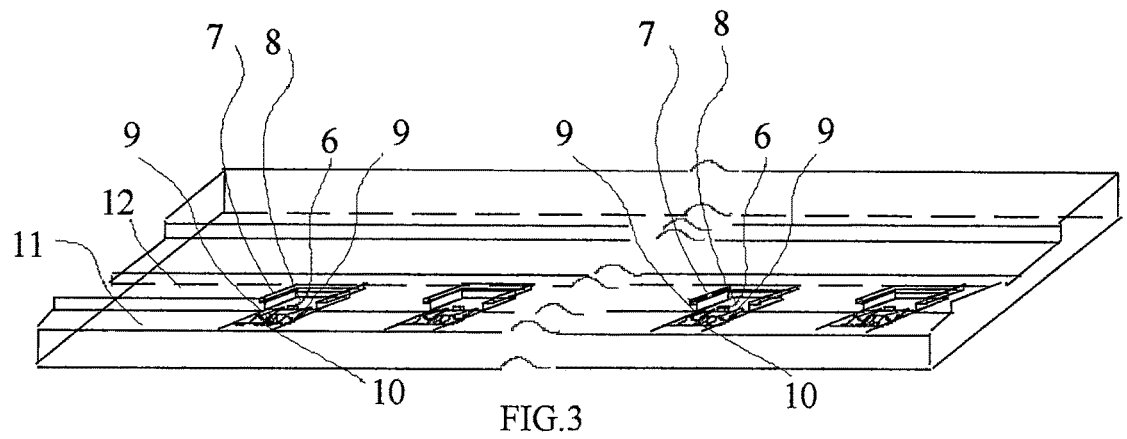
FIG. 3 Showing bottom injection molding plate of process.

Referencing commonly known sizes of ¼, ⅜ and M universal joints, as well as referencing material use as Plastic base current using "Interstate Plastics 'HDPE'" as it has a good chemical resistance, good low melting point and durable, not limited to material better suited per use as to greater chemical resistance, durability and heat melting points to effetely mold and attach to compatible melting temperatures of material 2 to attaching material 3, 4 of FIG. 3.

Referencing PVC and Carbon Fiber as well as other know plastic base or other fire and flame resistance material or a mixture of or additives.

FIG. 2 showing the stop assembly 1, the stop 3, the attachment 4, the attachment supports from attachment to stop whereas the means to attach is by means of injection molding as to melting of injected material or materials to the attachment of fusing and or saturation of the injected material through as well material that is of density limiting fusing that the means to placing a hole through material to be attached relevant to the size of attachment described or less be made in line with 9 and 10 not limited to as to manual forming and attachment through a chemical means, the material being attached to as to thinness of stop to its effective location and the durability of the attachment, 5 the center of thinning the attachment and stop material as to clearance to improving the effective installation of this stop design by means of the clearance of the moving part's and the outer rounded installation channel to bottom surface of said universal channel to whereas the most largest circumference diameter of the middle of said channel would need more clearance during greater angle of rotation of the universal joint.

Figure 4:
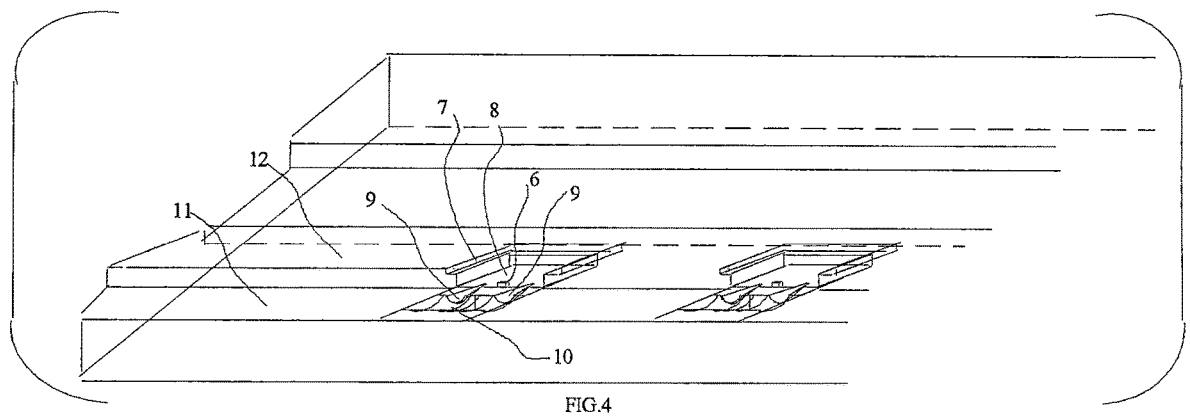
FIG. 4 Showing enlarged detail view of FIG. 3 of process.

FIG. 3 showing the process bottom plate of the process of the stop and attachments in elements 6-12, with enlarged view of FIG. 4, whereas 6 is the process elevation in mold cavity to reduce material of 5 as described above.

The mold cavity seal surface 7 on three sides to whereas the bottom mold plate is elevated as to surface direction angled FIG. 4 shows enlarged view of elements 6, 7, 8, 12, from the top main structure of the top mold angle plate to whereas heat temperatures as to material can be better managed from bottom to top for injection smoothness and cooling of removing from mold.

Whereas the temperature of the bottom plate be of less as to the material being attached to time of placement and the top of greater temperature as to the flow as to the melting point of the material being injected, to its time of heating and flashing points of maintaining the material structure and durable with speed of injection maintaining the balance 8, Stop mold cavity, 9 Support bridge rounded groove as 1/16 ball radios to estimated 0.015 depth tapered out to forward end of stop cavity and as described above, 10.

Bottom attachment rounded slot as to forming the shape of a half rounded bar that runs on top and bottom the attaching material to the width of the stop to a tolerance of—or to the dimensions of the—support grooves 9 to 9 outer edges within 8 and the width of the grove being current and not limited to 1/16 ball radios to estimated 0.015 in depth, all dimensions are not limited to as to desired thinness and shape of stop, stops and attachment or attachments, 11.

Process, bottom injection mold plate, flex material forward edge placement to attaching whereas the material that is being attached to is located on its flat surface on the flat surface of 11. with its edge up to the squire shoulder of 12, 12.

Figure 5:
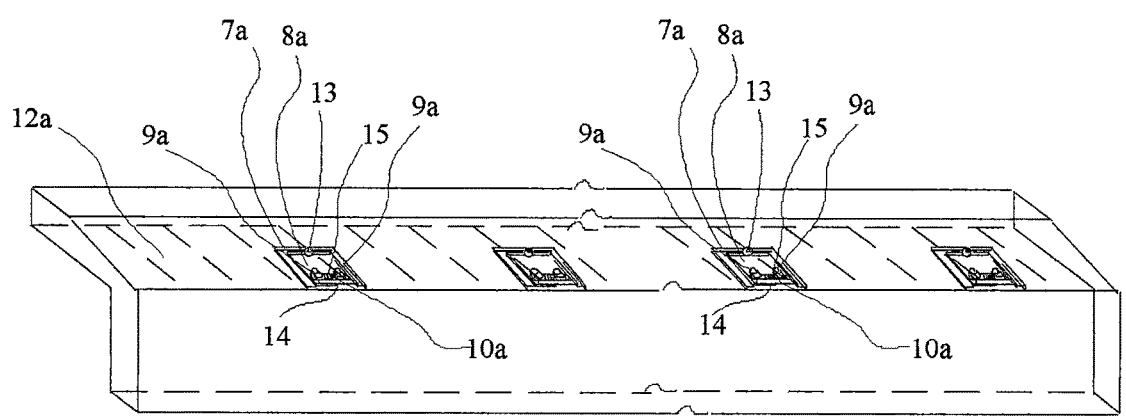
FIG. 5 Showing top angle injection molding plate of process.
Figure 6:
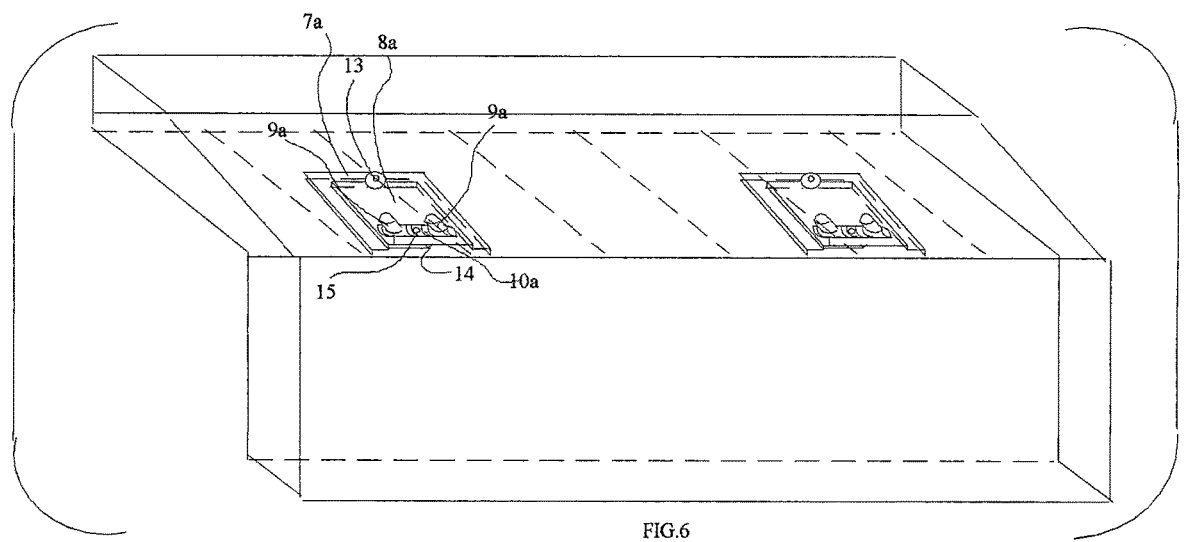
FIG. 6 Showing enlarged detailed view of FIG. 5.

Process, Angle of stop to attachment. This shows the angle that of 1. Angled solid stop, 6. Process elevation in mold cavity to reduce material of 5, as to the use of FIG. 3, 9, 7, Mold cavity seal surface three sides, currently FIG. 3, elements 6, 7, 8, 12; FIG. 5, elements 6a, 7a, 8, 9a, 10, 12a, at estimated 8 degrees from 90 and the advantage as when attaching to material 2 and attaching material 2 to the outer sleeve the stop attached attachment to said outer sleeve will be angled outward to a system of assisting in flexing in to its installed location of the universal joint channel as per described per referencing improvements of, FIG. 5 showing the top of the molding device angle plate and it features better viewed in FIG. 6 enlarged view.

Figure 7:
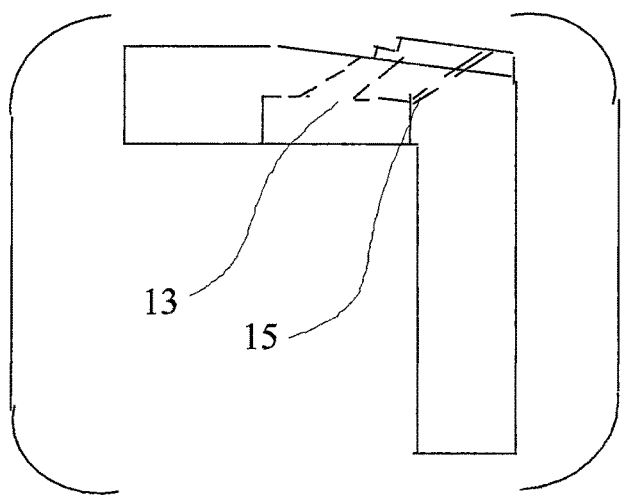
FIG. 7 Enlarged side view of FIG. 6 inject and optional vent ports.
Figure 8:
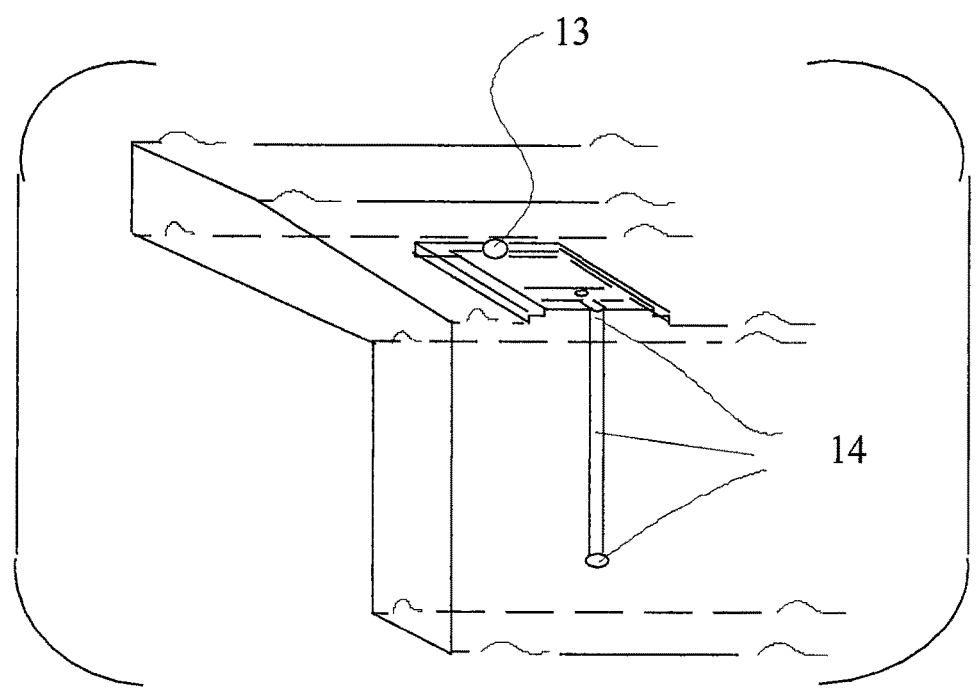
FIG. 8 Showing enlarged detail view of vent port.

Whereas 7a is the top seal and 8a is the surface that determines by means of depth with the tolerance of the sides shown of FIG. 4, 7 to 8 to fit as sealing parts to a predetermined depth for thinness of the stop or stops and as to seal the edges that of FIG. 4, 7 to 8 to limited to no additional injected material be beyond the stop cavity with in tolerance of mold cavity FIG. 4, 8 to FIG. 6, 8a, 9a is that of the same of 9 with the change that of 9 is milled and or made from the flat surface of 11 and 9a is of the complete angle of the stop and attachment distance of 12a that of 12 being reduced in distance of by the distance of 11 to the shoulder of 12, 9a grooves are the same described above that of 9 with changes as to do not taper in to the stop cavity and end just beyond the attachment 3, 10a same as described that of 10, tapered injector port 13, air release port 14.

The optional tapered air release port 15 for manual injection, with FIG. 7 showing side enlarged view of tapered injector port 13. Whereas showing counter bore clearance is on a lesser degree angle 13 to FIG. 7, and to correction that of a 90 degree to vent port 15, and vent port 15. FIG. 8 showing enlarged view of 14 with shown the air flow channels and ports to direct the displacement of air and limiting removal of possible additional material from injection process.

Figure 9:
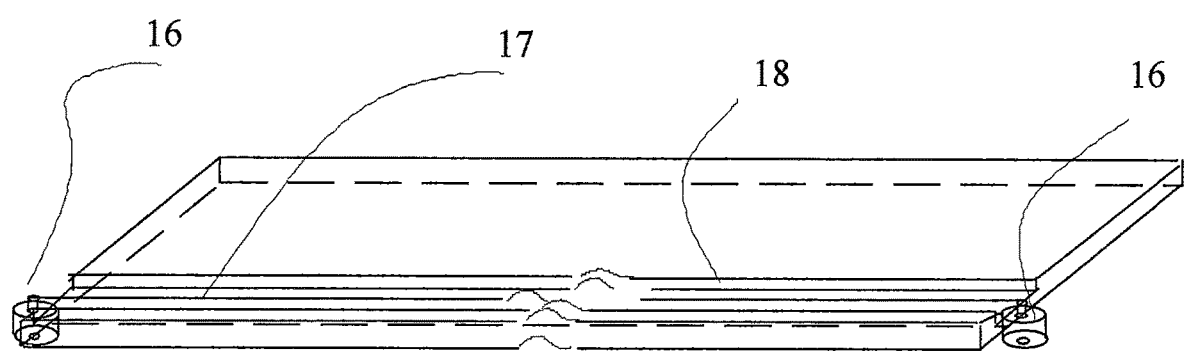
FIG. 9 Showing heating plate, means to heat FIG. 3 process.

FIG. 9 showing means process plate for use in applying heat for injection material flow and to assist attachment or attachments, with tapered air release port 16, Electric insulated connectors 17, Electrical resistance wire or wires 18. Resistance wire or wires clearance channel in heating plate, as to a great degree of heat to the top angle plate described above for improve flow currently sing using an air heat system whereas can be heated quickly and cool faster than say ceramic or other types of heating not but limited to air.

Figure 10:
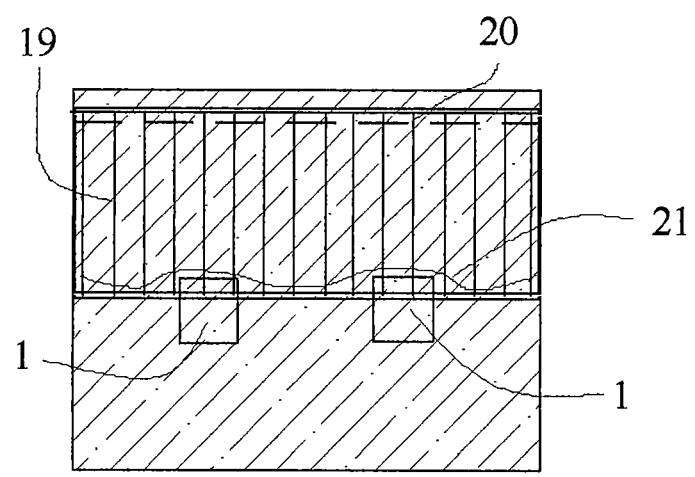
FIG. 10 Showing updated attachment 21.

FIG. 10 showing the resistance wires 21 being an improved attachment to stop 1, and wherein is an optional attachment as not limited to straight shape, stops 1 with showing the placement but not limited to.

Further, known materials consisting of aluminum, aluminum alloy, steel and its alloys. Whereas, FIG. 3 bottom mold plate and FIG. 5 angled top mold plate as described above and placed together to show a complete molding process.

The invention claimed is:

1. An angled stop of a universal joint in combination with a flexible sleeve comprising:
    a universal joint comprising a forward end, a trailing end and a pivoting portion positioned between said ends, the pivoting portion forming a channel having a bottom surface;
    a flexible sleeve comprising:
    an outer layer having a length defining a first edge and a second edge;
    an inner layer coupled to the outer layer between said first edge and said second edge, the layers together forming a flexible tube completely covering the universal joint, wherein said front end and said rear end of the outer layer extend beyond said forward end and said trailing end of the universal joint with the inner layer covering the pivoting portion of the universal joint;
    the inner layer having a trailing end, the trailing end defining a relatively solid projection forming a flexible stop that engages the bottom surface of the channel;
    wherein the flexible sleeve covering the universal joint allows pivoting of the universal joint while said engagement of the flexible stop and the channel prevents slippage;
    with an improvement to the flexible stop with a thinned angled stop, comprising:
    said thinned angle stop having tapered outer edges for durable attachment, and the channel having a rounded bottom surface.

2. The angled stop of claim 1, wherein the stop comprises a material selected from the group consisting of high density polyethylene "HDPE", polyvinyl chloride "PVC", carbon fiber, other known plastics, fire and flame resistance material or additives and combinations thereof.

3. The angled stop of claim 1 wherein said attachment to said material flexing is made via molding.

* * * * *